Jan. 5, 1926.

J. MITCHELL ET AL 1,568,902

BRAKE SLACK ADJUSTER FOR RAILWAY AND LIKE VEHICLES

Filed Jan. 19, 1925     2 Sheets-Sheet 1

Inventors
J. Mitchell
J. C. G. Cossey
by Wilkinson & Giusta
Attorneys.

Jan. 5, 1926. 1,568,902
J. MITCHELL ET AL
BRAKE SLACK ADJUSTER FOR RAILWAY AND LIKE VEHICLES
Filed Jan. 19, 1925 2 Sheets-Sheet 2
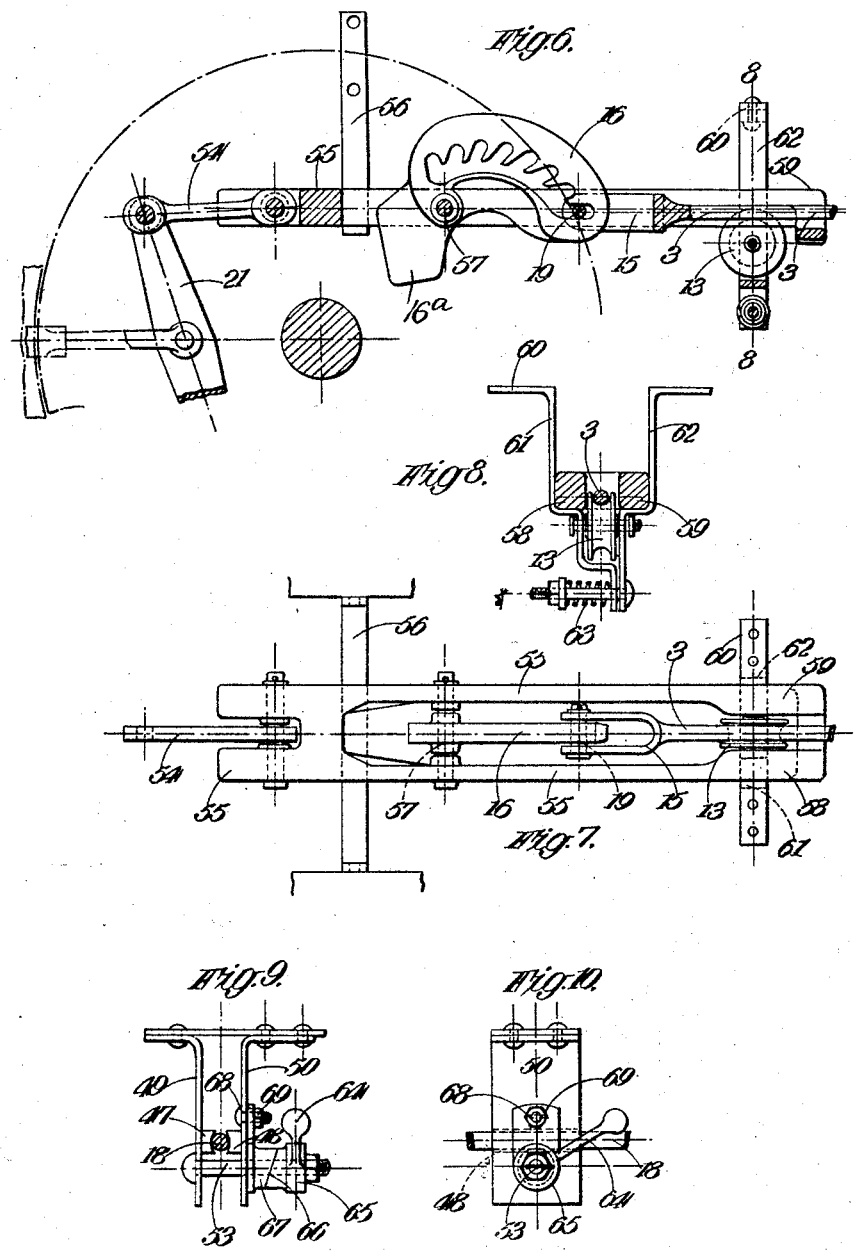
Inventors
J. Mitchell
and J.C.G. Cossey
by Wilkinson & Fiuata
Attorneys.

Patented Jan. 5, 1926.

1,568,902

UNITED STATES PATENT OFFICE.

JOHN MITCHELL AND JOHN CECIL GEORGE COSSEY, OF LONDON, ENGLAND.

BRAKE SLACK ADJUSTER FOR RAILWAY AND LIKE VEHICLES.

Application filed January 19, 1925. Serial No. 3,501.

*To all whom it may concern:*

Be it known that we, JOHN MITCHELL and JOHN CECIL GEORGE COSSEY, both subjects of the King of Great Britain, residing in London, England, have jointly invented certain new and useful Improvements in Brake Slack Adjusters for Railway and like Vehicles, of which the following is a specification.

In U. S. Patent No. 1,478,957 a brake slack adjuster for railway vehicles is described in which a slotted and internally toothed segment is connected to the pull rods and a pin, mounted in a lever arm connected to the brake rods, engages in the teeth of the segment. The arrangement is such that when, owing to the wear of the brake blocks and the wheel tyre, the distance between their engaging surfaces in the "off" condition exceeds a given amount, the pin, on the release of the brake, engages with another tooth of the segment and lessens this distance to a corresponding extent.

In the application of the brake to certain classes of vehicles the drawback is experienced that the brake rigging in connection with the pin, that is on the brake side of the toothed segment, moves so rapidly, under the restoring forces of the brake gear, that the time is insufficient to allow the next succeeding tooth to engage with the pin and thereby take up the slack.

This drawback is obviated according to the invention by the provision of means by which during the return of the brake to the "off" position, the motion of the pull rod on the brake side of the segment is retarded relatively to the movement of the pull rod on the opposite side of the segment.

In a preferred form the retardation is effected by the arrangement in which the rod to which the pin is secured slides in split bushes which are drawn together by the pressure due to a weighted lever. The weight is preferably carried at the end of a pivoted arm, the other end of which presses on the upper bush close to the fulcrum of the lever, so that a comparatively small weight is sufficient to provide the necessary pressure and consequently friction between the sliding rod and the split bushes.

Spring pressure may be substituted for the weight and various modifications made in the method of applying the weight or spring in order to obtain the required relative retardation between the return movements of the pin and the toothed segment with which it engages.

Figure 1:
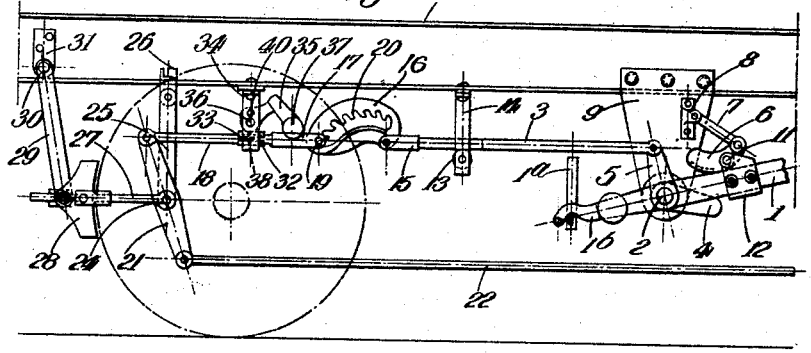
Figure 2:
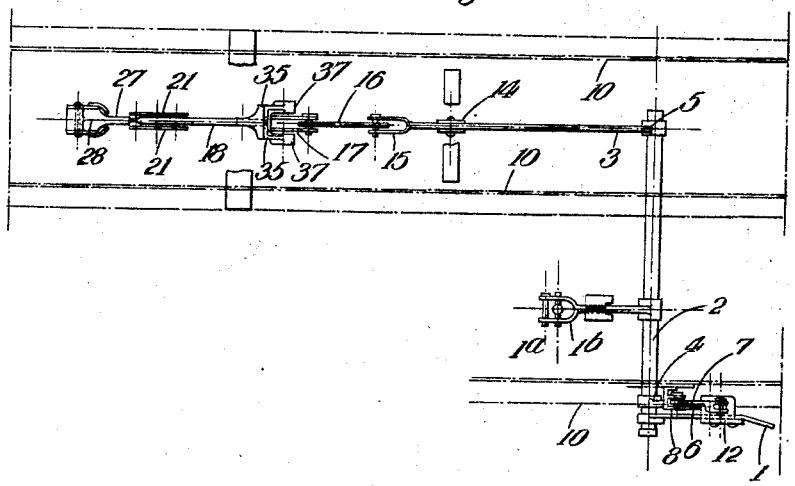
Figure 3:
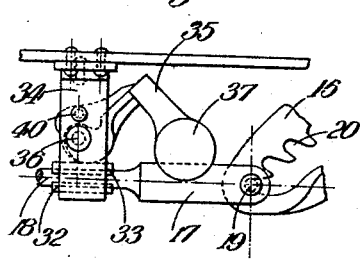
Figures 4, 5:
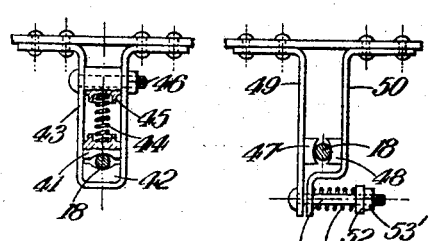

In the accompanying drawings, Fig. 1 is a side view and Fig. 2 a plan of a brake slack adjuster according to the invention, Fig. 3 shows on a larger scale the pivoted weight for pressing the split bushes against the pull rod. Fig. 4 shows a modification in which the weight is replaced by a spring. Fig. 5 shows a slightly different application of the spring pressure. Figs. 6 and 7 are, respectively, side and plan views and Fig. 8 a section on the line 8—8 of Fig. 6 of a further modification in which the release movement of the pull rod is retarded by a spring. Figs. 9 and 10 illustrate, respectively, in front and side views a further modification in which the pressure on the pull rod is applied by a weight.

Referring to Figs. 1–3, 1 is the hand operated lever, pivoted loosely on a shaft 2 to which is keyed an arm 4 and also an arm 5 pivoted to the pull rod 3. The upper end of a curved lever 6 is pinned to a link 7 mounted in lugs 8 of a bracket 9 which is secured to the under frame 10 of the vehicle and also supports the shaft 2. The member 6 is also pinned at 11 to a casting 12 riveted to the lever 1 and as this lever is operated to apply the brakes the under side of the member 6 engages with the arm 4, and as explained in U. S. Patent No. 1,478,957 imparts a greater angular movement to the shaft 2 and the pull rod 3. By this device less space is required for the necessary range of movement of the free end of the lever 1. The rod 3 is supported on a roller 13 mounted in a hanger 14 secured to the frame 10 and the forked end 15 of the rod 3 is pivoted to one end of the toothed segment 16. The forked end 17 of the pull rod 18 carries a pin 19 which engages in known manner with the teeth 20 of the segment 16. A lever 21 is pivoted to the rod 18 and also to a pull rod 22 connected to the brake gear of another wheel and is supported at its centre 24 by a hanger 25 mounted in a bracket 26 riveted to the frame 10.

A brake rod 27 is pivoted at one end to the centre 24 of the lever 21 and at its other end to the brake block 28 which is mounted in the usual manner in the lower end of a hanger 29 pivoted at 30 in a bracket 31 riveted to the under frame 10.

When the brake is taken off by the movement of the hand lever 1, the brake gear returns to its "off" position under the action of the weight and elasticity of the hangers 25 and 29 and, if the wear of the parts has been sufficiently great, the segment 16 descends and allows the pin 19 to engage with the next adjacent tooth. For this purpose it is necessary that the movement of the pull rod 18 should be temporarily slower than that of the pull rod 3 in order that the pin 19 may have time to leave the tooth with which it was previously in engagement and enter the next tooth of the segment 16.

The required retardation of the rod 18 is obtained by the provision of bushes 32 and 33 surrounding the rod 18 and mounted in a hanger 34 riveted to the frame 10. The upper bush 33 is pressed against the rod 18 by a lever 35 (see particularly Fig. 3), pivoted in the hanger 34 on a pin 36 above the bushes 32 and 33; the weighted end 37 of the lever is recessed so as to move freely over the rod 18 and the end 38 of the lever below the pin 36 is curved where it engages with the bush 32. A curved recess 39 in the lever engaging with a stop pin 40 in the hanger 34 limits the upward movement of the lever.

The lever 1 can be power operated as indicated at 1ª and 1ᵇ.

In the modification shown in Fig. 4 the pull rod 18 is pressed against the upper and lower bearing blocks 41, 42, slidably mounted in a stirrup shaped bracket 43, under the pressure of a spring 44 abutting at one end on the upper block 41 and at the other end on a block 45 integral with a bolt 46 secured to the bracket.

In the modification shown in Fig. 5 the rod 18 slides between laterally disposed bearing blocks 47 and 48 integral with or secured to side supports 49, 50 which are pressed together by a spring 51 disposed between a collar 52 of a bolt 53, which passes through holes provided in the free ends of the supports 49, 50, the force exerted by the spring being controlled by means of a nut 53'.

In the modification shown on an enlarged scale in Figs. 6–8, the lever 21 is pivoted to a short link 54 to which is pinned the pull rod 55 guided in a hanger 56. In this example the toothed segment 16 is pivoted at 57 to the rod 55 and carries a counter-weight 16ᴬ and the pin 19 engaging in the teeth of the segment is secured to the forked end 15 of the pull rod 3. The pull rod 55 is forked, the free ends 58, 59 of the fork being engaged by the sides 61, 62 of a split bracket or hanger 60 and pressure is exerted on the rod 55 by a spring 63 in a manner similar to that described in the preceding example. The toothed segment 16 and the forked end of the pull rod 3 lie freely between the forks of the rod 55.

In the further modification shown in Figs. 9 and 10, the arrangement is similar to that shown in Fig. 5, but the spring 51 is replaced by a weighted lever 64 mounted loosely on the bolt 53 passing through holes in the supports 49, 50 to which are secured the bearing blocks 47, 48 engaging the pull rod 18. The collar 65 by which the lever 64 is mounted on the bolt 53 is provided with a lateral extension terminating in an inclined plane surface 66 engaging the similarly formed surface of a sleeve 67 secured by a bolt 68 and nut 69 to the support 50. The block 48 is, consequently, pressed against the pull rod 18 by a force proportional to the torque exerted by the weighted lever 64.

It is obvious that many other variations are possible in the devices described for producing the required frictional resistance to the motion of that portion of the pull rod which is nearest to the brake blocks.

Having thus described the nature of the said invention and the best means we know of carrying the same into practical effect, we claim:—

1. A brake slack adjuster comprising a pull rod divided into two parts, a slotted and internally toothed segment interposed between said parts and connected to one part, a pin on the other of the parts of said pull rod, said pin being adapted to engage a tooth of said segment, and thereby take up any slack in the brake gear, and means for retarding, during the return of the brake gear to the "off" position, the movement of the part of the pull rod connected to the brake relatively to the movement of the part connected to the toothed segment.

2. A brake slack adjuster comprising a pull rod divided into two parts, a slotted and internally toothed segment interposed between said parts and connected to one part, a pin on the other of the parts of said pull rod, said pin being adapted to engage a tooth of said segment, and thereby take up any slack in the brake gear, and means for retarding during the return of the brake gear to the "off" position, the movement of the part of the pull rod connected to the brake relatively to the movement of the part connected to the toothed segment, said retarding means comprising bushes pressing against the surface of said rod.

3. A brake slack adjuster comprising a pull rod divided into two parts, a slotted and internally toothed segment interposed between said parts and connected to one part, a pin on the other of the parts of said pull rod, said pin being adapted to engage a tooth of said segment, and thereby take up any slack in the brake gear, and means for retarding, during the return of the brake gear to the "off" position, the movement of the part of the pull rod connected to the brake relatively to the movement of the part connected to the toothed segment, said retarding means comprising a split bush engaging said pull rod, and means for applying pressure to said bush.

4. A brake slack adjuster comprising a pull rod divided into two parts, a slotted and internally toothed segment interposed between said parts and connected to one part, a pin on the other of the parts of said pull rod, said pin being adapted to engage a tooth of said segment, and thereby take up any slack in the brake gear, and means for retarding, during the return of the brake gear to the "off" position, the movement of the part of the pull rod connected to the brake relatively to the movement of the part connected to the toothed segment, said retarding means comprising a split bush engaging said pull rod, and a weighted lever by means of which pressure is applied to said bush.

5. A brake slack adjuster comprising a pull rod divided into two parts, a slotted and internally toothed segment interposed between said parts and connected to one part, a pin on the other of the parts of said pull rod, said pin being adapted to engage a tooth of said segment, and thereby take up any slack in the brake gear, and means for retarding, during the return of the brake gear to the "off" position, the movement of the part of the pull rod connected to the brake relatively to the movement of the part connected to the toothed segment, said retarding means comprising a split bush engaging said pull rod and a weighted lever engaging the bush close to the fulcrum of the lever and having a curved end.

In testimony whereof we have signed our names to this specification.

JOHN MITCHELL.
JOHN CECIL GEORGE COSSEY.